United States Patent [19]

Keyser

[11] Patent Number: 5,076,992

[45] Date of Patent: Dec. 31, 1991

[54] METHOD OF IN MOLD LABELING OF A BLOW MOLDED ARTICLE

[75] Inventor: Frank T. Keyser, Sycamore, Ill.

[73] Assignee: Liquid Container Corporation, Chicago, Ill.

[21] Appl. No.: 619,049

[22] Filed: Nov. 28, 1990

Related U.S. Application Data

[62] Division of Ser. No. 137,182, Dec. 23, 1987, Pat. No. 4,834,641, and Ser. No. 312,717, Feb. 21, 1989, Pat. No. 4,919,879, and Ser. No. 433,328, Nov. 8, 1989, Pat. No. 4,973,241, and Ser. No. 588,167, Sep. 26, 1990, Pat. No. 5,028,229.

[51] Int. Cl.[5] .............................................. B29C 49/24
[52] U.S. Cl. ...................................... 264/509; 271/12; 425/503
[58] Field of Search ................. 264/509; 425/503, 504; 271/11, 12

[56] References Cited

U.S. PATENT DOCUMENTS 4,563,148 1/1986 Hasi et al. ............................ 425/503
4,680,000 7/1987 Nowicki et al. ................. 425/126.1
4,769,205 9/1988 Oles et al. ............................ 264/509
4,840,366 6/1989 Johnston et al. ..................... 425/503
4,919,879 4/1990 Keyser ................................. 425/503

Primary Examiner—Jan H. Silbaugh
Assistant Examiner—Catherine Timm

[57] ABSTRACT

An in-mold labeling method and apparatus for a blow molding machine having a primary circular multiple mold path. A continuous drive closed circuit is provided by a guide track and forms a secondary path in which a carriage or trolley carrying an air actuated device for picking and holding a label for transport to a matched segmental transfer station at which the mold parts and the carriage move in unison at zero relative velocity during which the label is automatically deposited in a mold for application to the plastic part being formed by the mold. Thereafter, the carriage or trolley is conditioned to pick up another label. The continuous driving of both the blow molding machine and the in-mold label dispenser is synchronized for unison uninterrupted operation.

2 Claims, 9 Drawing Sheets

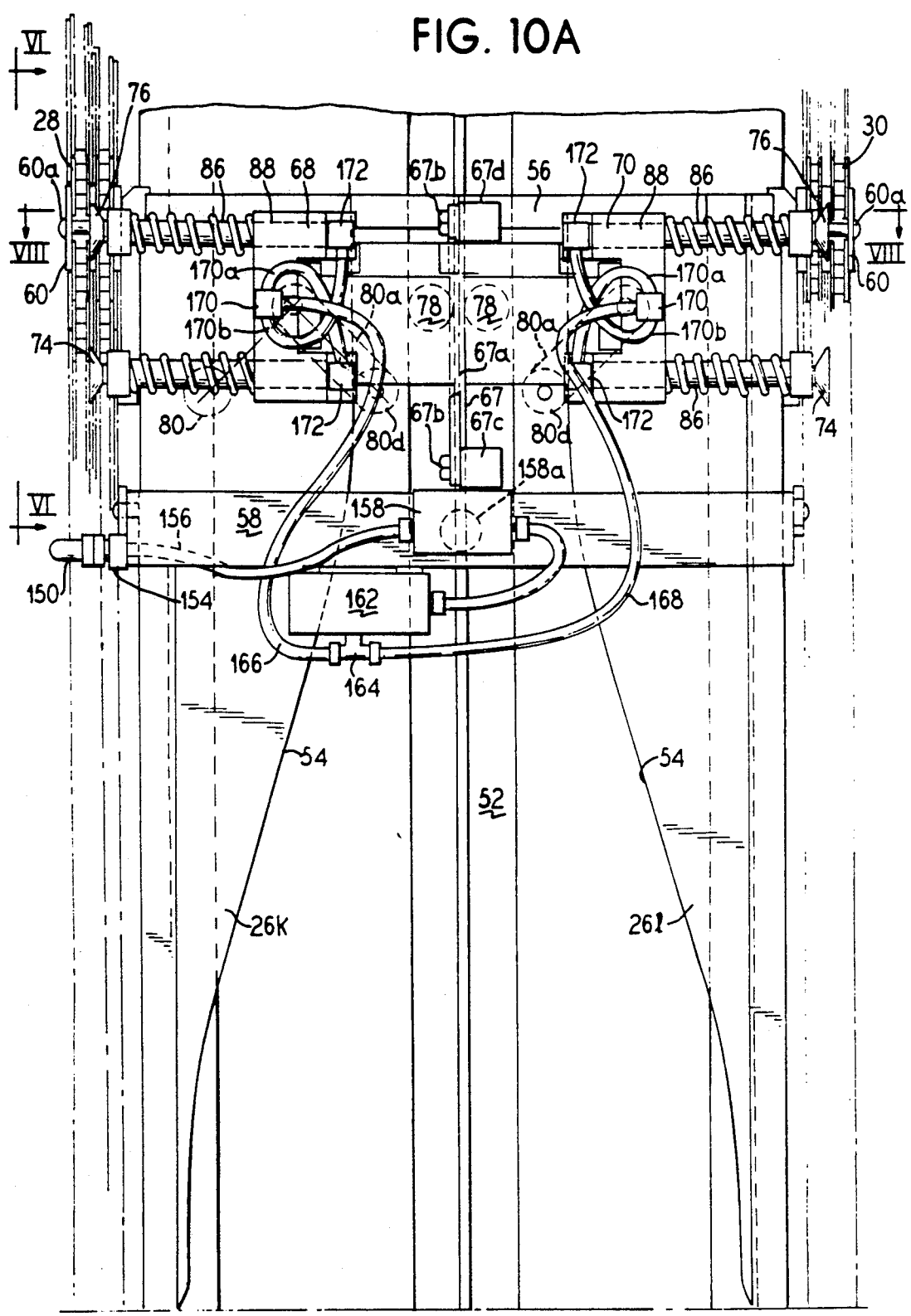

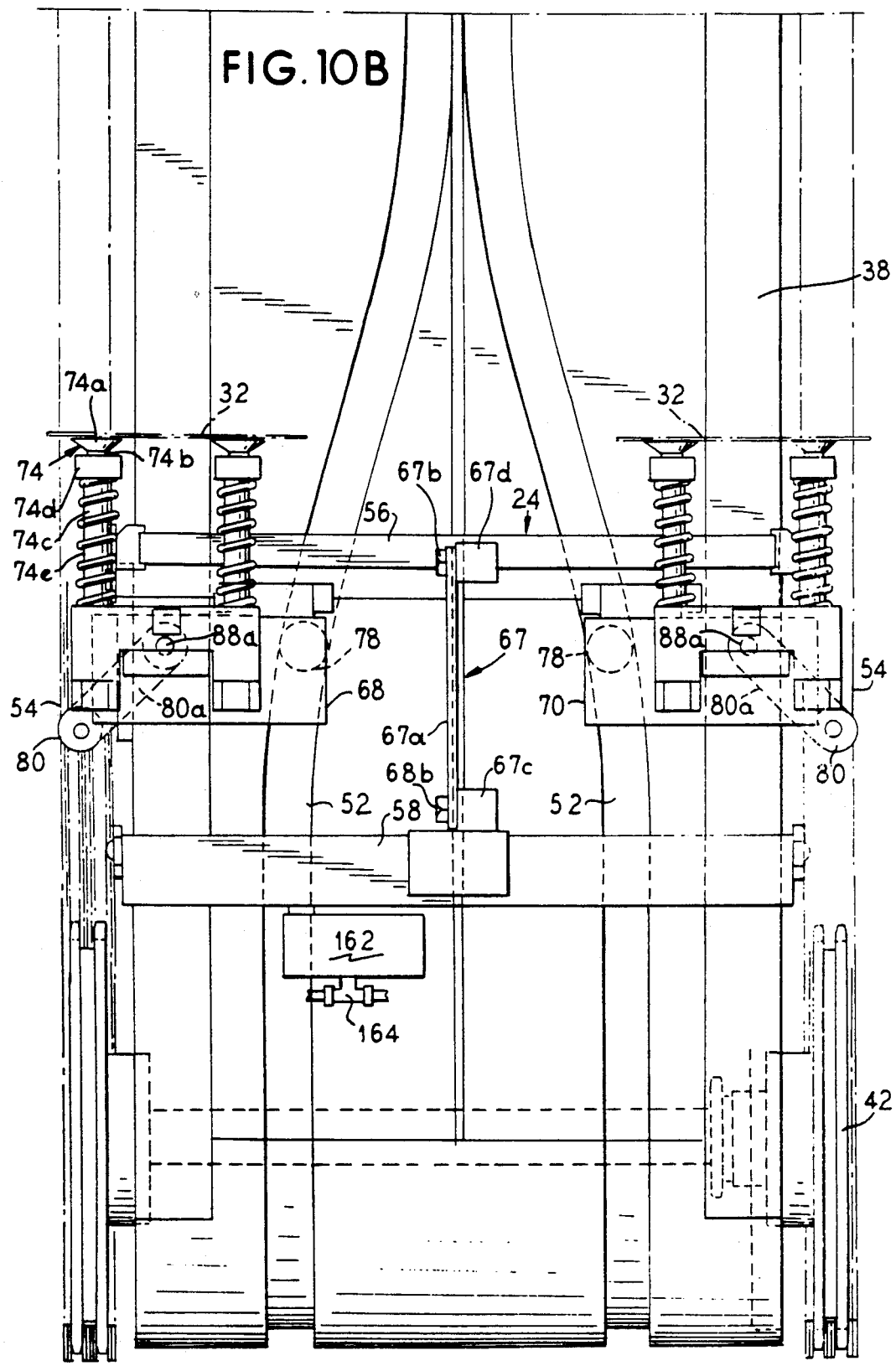

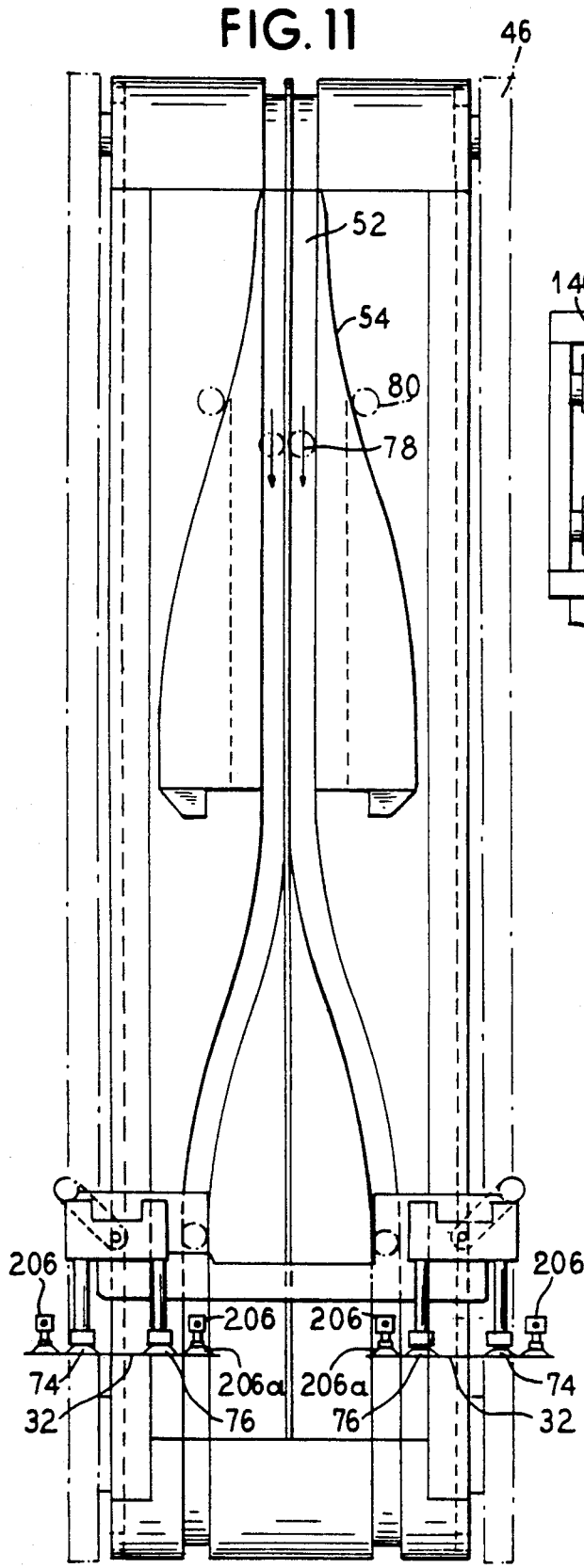
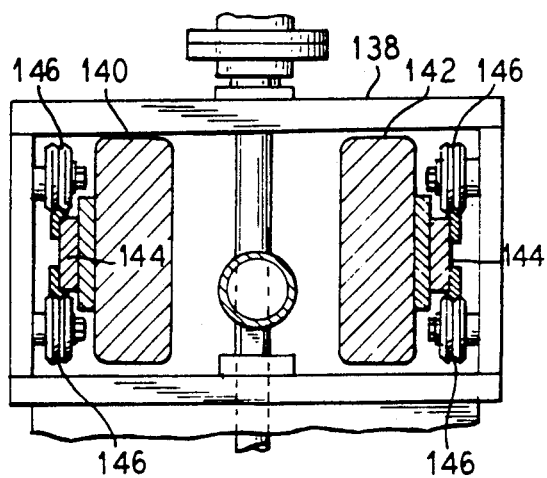
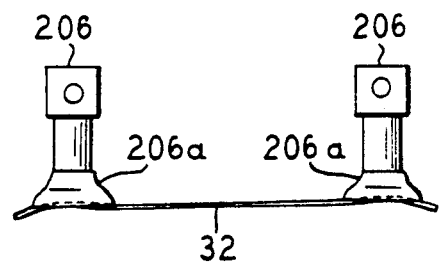

METHOD OF IN MOLD LABELING OF A BLOW MOLDED ARTICLE

BACKGROUND OF THE INVENTION

Related Applications

This application is a division of my application Ser. No. 137,182 filed Dec. 23, 1987, now U.S. Pat. No. 4,834,641 issued May 30, 1989, and my application Ser. No. 312,717 filed Feb. 21, 1989 now U.S. Pat. No. 4,919,879 issued Apr. 24, 1990, and my application Ser. No. 433,328 filed Nov. 8, 1989, now U.S. Pat. No. 4,973,241 issued Nov. 27, 1990, and my co-pending application Ser. No. 588,167 filed Sept. 26, 1990 now U.S. Pat. No. 5,028,229.

FIELD OF THE INVENTION

This invention relates generally to blow molding machines and more particularly to a method and apparatus for in-mold labeling of blow molded articles.

DESCRIPTION OF THE PRIOR ART

In-mold labeling is performed by inserting a label within the mold prior to the extrusion of the hot plastic tube and subsequent closing of sections of the mold in preparation for the blowing operation. The subsequent blowing operation forms the hot plastic tube around the label to the shape of the mold and activates a heat sensitive adhesive that provides a permanent bond which reduces the chances of being broken by moisture.

The prior art includes label carriers with vacuum cups that receive a label from a magazine and deposit the label within the mold cavity. Such vacuum carriers are sometimes mounted on levers or arms that move in an angular path with respect to the direction of opening and closing movement of corresponding mold sections in order to permit the deposit of the label.

Other prior art in-mold label dispensers include label carriers that move on an abruptly curved path and are actuated by complex linkage.

Still other prior art in-mold labelers include dispensing heads mounted for rectilinear movement along multiple axes. Somewhat complex coordination of mechanical systems is required to deliver labels to the open mold. Reference may conveniently be made to the U.S. Pat. Nos. 4,359,314, 4,397,625, 4,479,770 which are examples of the current state of the art.

In all of the prior art devices, the mechanisms employed have required arms or linkages which insert the label into the mold at a single point of intersection of the path of such mold with complex coordination mechanisms, thus requiring a slow operation with limited productivity.

SUMMARY OF THE INVENTION

According to the present invention, there is provided a trolley or carriage which is continuously driven through a guide track means forming a closed circuit. The trolley or carriage cooperates with a rotating, circular blow molding machine having a plurality of mold pairs around its periphery. Each mold pair has an open and closed position and the trolley or carriage dispenses one or more labels within each mold by matching the speed and path of such mold pair during its position in continuous synchronism.

The circular mold path forms a primary path while the guide track means forms a secondary path. A specific overlapping segment of the two paths extends through a discrete distance through which the mold and the carriage moves simultaneously and in unison at zero relative velocity, thereby permitting the label to be transferred from the carriage to the mold without interruption of either.

BRIEF DESCRIPTION OF THE DRAWINGS

Best mode embodiments of the invention are shown in the attached sheets of drawings wherein like reference numerals identify identical elements and wherein:

FIG. 6 is a side elevational view taken on the plane of VI—VI of FIG. 10a;

FIG. 10a is an elevational view taken on line XA—XA of FIG. 4;

FIG. 10b is an elevational view taken on line XB—XB of FIG. 4;

FIG. 11 is an elevational view taken on the plane of line XI—XI of FIG. 4.

FIG. 12 is a horizontal fragmentary cross-sectional view taken along line XII—XII of FIG. 3 illustrating the adjustment mechanism of the present invention; and FIG. 13 is an enlarged fragmentary view on the same plane as FIG. 11, but showing additional details of the bridging relationship of the label pickup.

DESCRIPTION OF THE PREFERRED EMBODIMENTS

Figure 1:
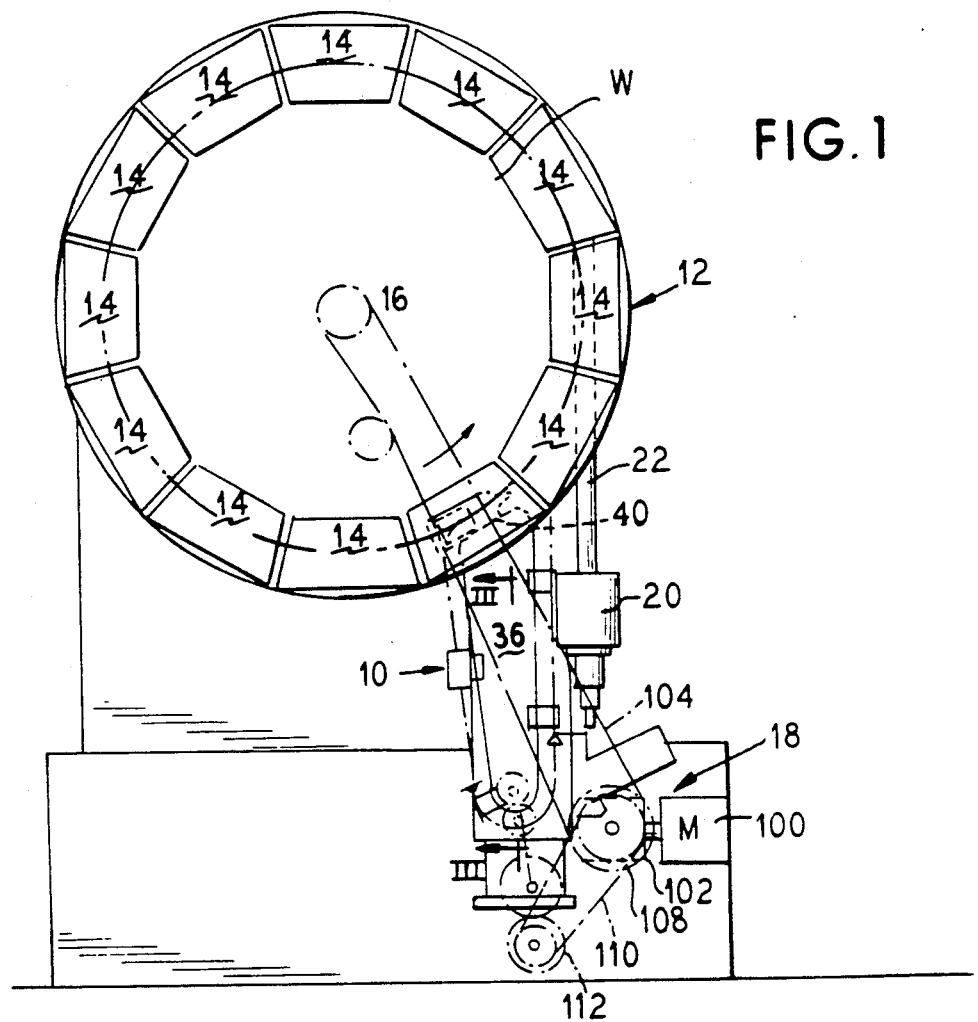
FIG. 1 is a somewhat schematic side elevation of a wellknown commercial rotating blow molding machine with which the in-mold labeling invention of the present disclosure has been integrated.

Blow molding is a process of forming a tube, called a parison, and introducing air or other gas to cause the tube to expand into a freeblown hollow object or against a mold for forming into a hollow object with a definite size and shape. The parison is traditionally made by extrusion of a polymer material or other plastic, although injection of molded tubes may also be used since such parts do not require post finishing, have better dimensional tolerances, in wall thicknesses and can be made unsymmetrical and in higher volume production.

In accordance with the principles of the present invention, and in-mold labeler shown generally at 10 is integrated with a blow molding machine shown generally at 12. The in-mold labeler 10 of the present invention can be used in many different blow molding machine environments. It should be understood therefore that the particular blow molding machine 12 illustrated herein is for purposes of describing the invention in its field of utility. Thus, the blow molding machine 12 has a plurality of molds each indicated at 14 and in this embodiment, there are 12 such molds arranged in a circumferential array on a wheel W which rotates on axis 16 in the direction of an arrow appearing in FIG. 1.

Each of the molds 14 has a mold half 14a and a mold half 14b which move on the periphery of the wheel W adjacent on extruder having a die head 20 which receives a molded plastic from a source. A parison 22 is projected from the die head 20 to a position between the mold halves 14a and 14b.

Thereafter, as the wheel W continues to rotate, the mold halves 14a and 14b of the respective molds 14 are closed and the plastic material of the parison 22 is forced outwardly against the walls of the mold cavity of each mold half 14a and 14b by air or other gas injected by the blow molding machine 12 into the center of the parison 22. The air expands the plastic to form a hollow object having the shape of the mold. After cooling upon rotation for a fraction of a revolution of the wheel W, the blow molded plastic part is ejected from the mold in preparation for the next cycle.

Referring now to FIG. 1 in connection with the other FIGS. 4–11, the in-mold labeler 10 comprises a carriage means including a plurality of trolleys or carriages 24 which are continuously driven in a closed circuit without any interruption and which closed circuit is formed by a guide track means 26.

The carriage means are propelled by two guide chains 28 and 30 which are trained over a lower driving sprocket 42 and two upper spaced apart sprockets 44 and 46. The mechanism is driven in such a manner that the speed of the carriages is the same as the speed of the mold parts during travel through a specific segment of the circular mold path which is a primary path and which is matched with a specific segment of the guide track means which is a secondary path.

In order to understand the different stations along the continuous circuit of the guide track means, it may be helpful to note that the guide track means 26 is made up of first, second and third sections 26, 28 and 40. Section 36 forms a long vertical leg and extends generally between the lower sprocket 42 and the upper sprocket 46 while section 38 is a somewhat shorter generally vertical leg and disposed at a slight angle between the lower sprocket 42 and an upper sprocket 44. Section 40 of the guide track means is a section that runs over the spacing dimension between the sprockets 44 and 46 and is disposed to register between mold halves 14a and 14b on the wheel W. The section 40 is a segment of the guide track means which forms a secondary path which matches the arc of the primary path over a discrete distance.

Figure 7:
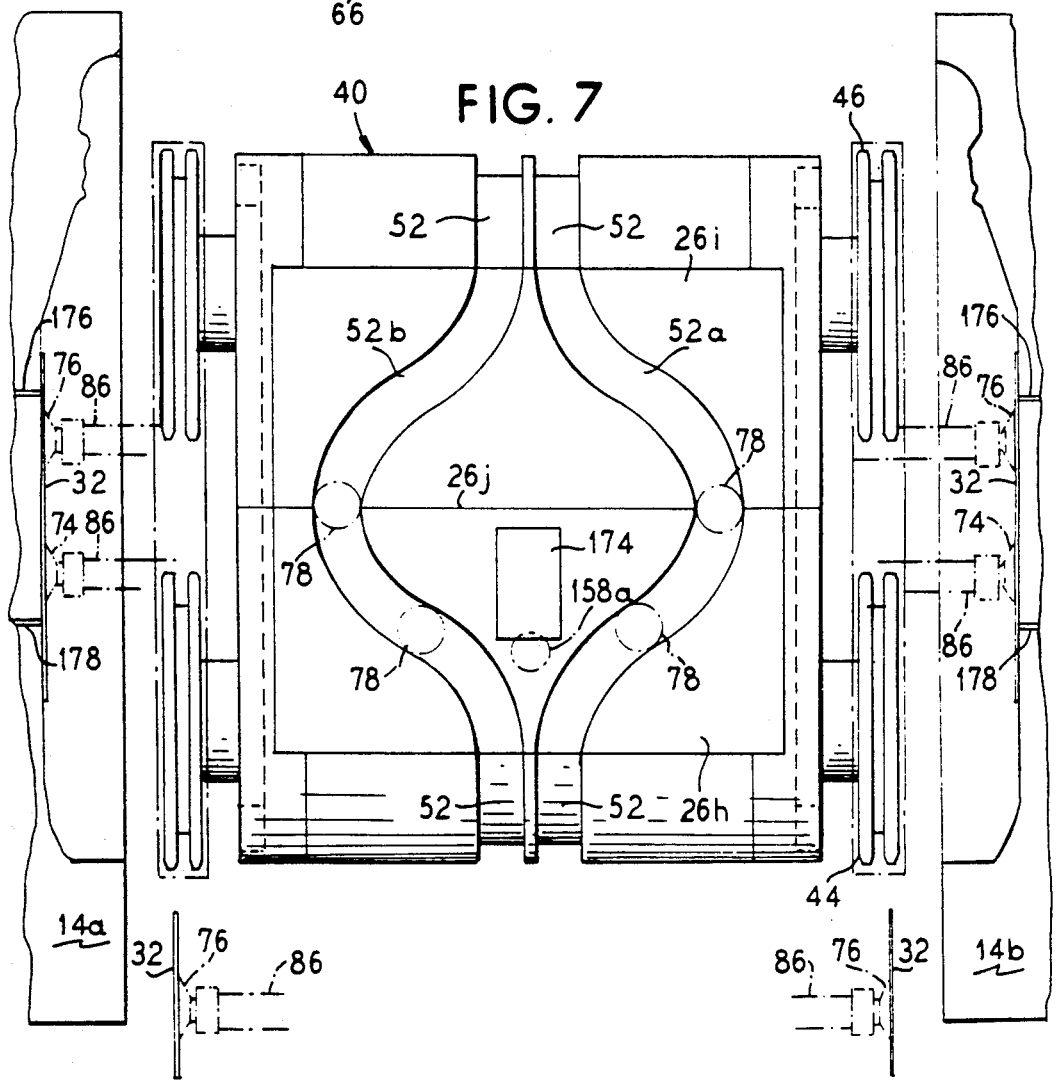
FIG. 7 is a view taken on the plane of VII—VII of FIG. 4.

In accordance with this invention, the mold parts and the carriage means move through the matched paths in unison and at zero relative velocity. It will be understood that the drive chains 28 and 30 are generally disposed on the outside of the guide track means 26. Thus, during traverse of each trolley or carriage 24 within the closed circuit, each trolley 24 is adapted to receive a label 32 from a dispenser 34 disposed at one point in the circuit adjacent the section 36 whereupon the trolley 24 continues around the circuit to a second point in the circuit corresponding to a position between the mold halves 14a and 14b in registration with the guide track section 40 and deposits the label 32 interiorly within the mold halves 14a and 14b while travelling in unison with the mold halves. As shown in FIG. 7, means are provided to move the label inwardly and outwardly during zero relative velocity.

Figure 8:
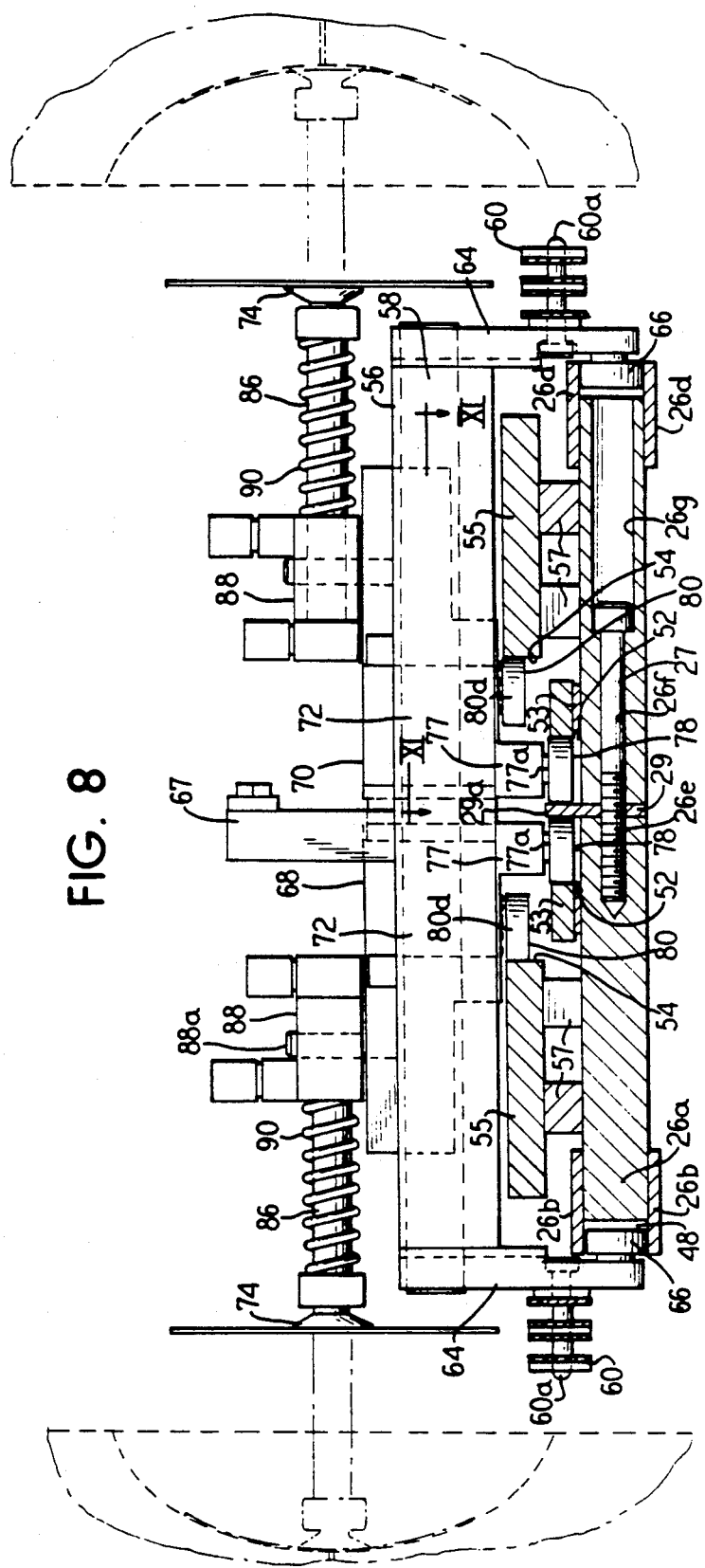
FIG. 8 is a view taken on the plane of VIII—VIII of FIG. 10a, but showing portions of the track in cross-section and showing portions of the trolley or carriage in elevation.

Details of the guide track means 26 are more specifically shown in FIG. 8. It will be noted that there is provided a first body member 26a which has on its outer edge a pair of plates 26b, 26b connected in firm assembly therewith to provide the channel 48.

A second body member 26c is provided and has a corresponding pair of plates or flanges 26d, 26d connected thereto which project beyond the outer edge of the body member 26c to form the channel 50.

In order to provide an intermediate camming surface, it will be noted that the body member 26a is bored and threaded as at 26e and the body member 26c is bored as at 26f and counter-bored as at 26g, thereby to receive a coupling screw 27. Clamped between the members 26a and 26c is an upstanding abutment member 29 which projects upwardly above the surface of the body members 26a and 26c as at 29a thereby to form roller engaging surfaces on opposite sides thereof.

In order to provide a channel 52 between the abutment 29 and a laterally outwardly position location, there is provided a pair of camming members 53,53. For portions of the length of the channel 52, each cam member 53 will be essentially an elongated strip. However, the cam track means 26 will include other sections wherein the groove 52 is formed by a member which extends out to the edges of the cam track means 26.

In order to provide a camming surface for the turret means on the trolleys or carriages 24, a turret camming member 55,55 is provided on opposite sides of the abutment 29 and is spaced laterally outwardly thereof, thereby to form an inwardly facing camming surface 54. The turret cam members 55,55 are connected to the respective body members 26a and 26c of the cam track means 26 by spacers shown at 57.

Turning now to the illustrations of the trolley or carriage 24, each trolley or carriage consists of two elongated base members 56 and 58 which are of sufficient length to extend across the width of the guide track means 26. Connected to the respective ends of each base member 56 and 58 are coupling connectors which facilitate a driving connection of the trolleys or carriages 24 to corresponding drive chains. More specifically, a chain connector 60 is provided which is of such size and configuration as to replace a chain link and is provided with a central rotational pin 60a which directly connects to a guide bracket 64, thereby allowing the trolley or carriage 24 to pivot as it travels around the adjacent sprockets 42, 44 and 46.

It will be noted that the bracket 64 has two guide wheels 66,66 disposed near its bottom edge and which are sized and shaped to be disposed in the channels 48 and 50 on the opposite ends of the guide track means 26.

As shown on FIG. 8, the two cross pieces 56 and 58 of the trolley or carriage 24 are interconnected by a cross piece 67 formed of an upper link 67a connected by appropriate fastening means 67b to an upstanding post 67c provided on the cross member 58 and a corresponding upstanding post 67d provided on the base member 56.

In order to carry a label from a label storage and pick up station to a mold, each trolley or carriage is provided with a turret assembly facilitating the necessary continuous motion features contemplated by the present invention.

First of all, each turret assembly generally shown at 68 and 70 is provided with a base lock 72 which is slidably engaged with a corresponding base member 56 or 58. In order to effect such slidable movement, the base block 72 is provided with a channel within which the base member 56 is received thereby providing the slidable engagement which permits the entire turret assembly to move in a lateral direction. Stop means 84 are provided at the ends of the base members 56 and 58 to prevent turret assembly 68 and 70 from leaving the ends of the respective base members.

In order to effect automatic continuous flow lateral movement of the base member, there is connected to each base block 72 a leg 77,77 which in turn has a pin 77a,77a on which is carried a cam follower 78,78. The cam follower is captured in the channel 52 and the cam follower 78,78 rollingly engages against the walls of the channel 52.

As shown specifically in FIG. 7, the guide track means 26 is formed with a pair of separate members 25h and 26i (FIG. 7) in which the channel 52 is specifically formed with laterally offset curved portions reaching a maximum at an axis 26j. Such portion of the channels 52,52 are identified at 52a and 52b respectively.

As each cam follower wheel 78,78 moves through its channel 52, when it reaches the offset portions 52a 52b, the wheel-shaped cam followers 78 will progressively move through the positions illustrated in FIG. 7 to the most laterally outwardly shifted positions on the axis 26j, thereby shifting the base blocks 72,72 to its laterally outward most position.

Each turret base block 72 carries an upper turret block assembly which is indicated generally at 88. A pin 88a disposed on a vertical axis is carried by the upper turret block assembly 88 and extends vertically downwardly through an opening formed in the lower turret base block 72 and extends outwardly for connection to a cam follower shown generally at 80 and comprising a lever arm 80a connected to the pin 88a as at 80b. The free end of the lever arm 80a mounts an axle 80c and the axle in turn carries a rotatable cam follower wheel 80d, which cam follower 80d is captured in a channel bounded by the cam surface 54 on the guide track means camming member 55.

Figure 6:
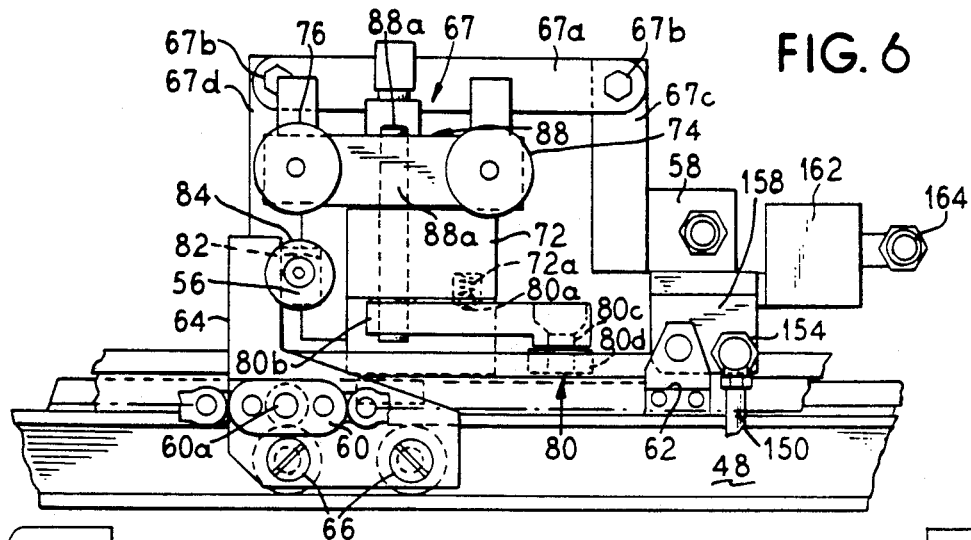
Figure 9:
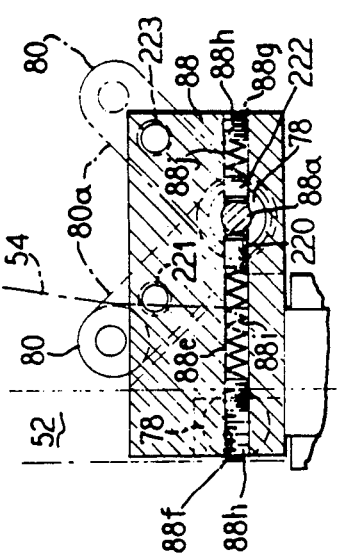
FIG. 9 is a partial sectional view taken on the line IX—IX of FIG. 8 showing additional details of a checking or braking unit.

As shown specifically in FIG. 9 when viewed in conjunction with FIGS. 6 and 8, the lever arm 80a moves between a first position shown in full lines on the left-hand side of FIG. 9 to a dotted line position on the right-hand side in response to a camming action which occurs at a specific point in the closed circuit formed by the cam track means. Referring to FIG. 10a in conjunction with FIG. 10b, it will be noted that the upper block assembly of the turret 88 in FIG. 10b is aligned in a first position with the cam follower 80 at its laterally outermost position. Each of said upper turret block assemblies 88,88 carries a pair of suction cup devices indicated generally at 74. Like numerals are used to identify like parts. Thus, there is a rubber suction cup 74a on the end of a conduit 74b which is in turn carried by a tube 74c having a head 74d and the entire subassembly is spring biased axially outwardly by a helically wound coil spring 74e. Thus, in the position of alignment of FIG. 10b, the suction cup means are disposed to extend longitudinally in the general longitudinal direction of the closed circuit means established by the guide track means 26 and generally parallel to the longitudinal direction of the camming surfaces 54. Referring now to FIG. 10a, it will be noted that the guide track means 26 are provided with members 26k and l which move laterally inwardly towards one another as depicted specifically in FIG. 10a to a minimum dimension at a transverse axis identified at 26m. At that position, the cam follower wheel 80 has moved from its outermost position (dotted lines shown on the left-hand upper side of FIG. 10a) to the innermost position at axis 26m (also FIG. 10a). It will be noted that the movement of the lever arms 80a,80a is approximately 90 degrees in the corresponding traverse of the cam surfaces 54 by the cam follower wheels 80d,80d and as a result, the upper turret block 88 will be correspondingly rotated 90 degrees so that the suction cup means will be positioned in registration with the axis 26m and in corresponding registration with the mold halves 14a and 14b (FIG. 7).

The registering alignment of the axis 26m corresponds with the registering alignment of the axis 26j so that in one continuous noninterrupted flowing movement, the laterally outward movement of the lower turret base member 72 will correspond to the position at which the suction cup means 74 are in registration with the mold halve parts 14a and 14b.

In order to provide smooth rotational motion of the upper turret, a braking system is provided as shown in FIG. 9. Thus, the upper turret member 88 is provided with a through bore 88e which is threaded as at 88f and 88g to receive closure plugs and which closure plugs 88h,88h may be threadably adjusted in the bore 88e to adjust the compressive tension on a coil spring 88i bottomed against the plug 88h in the bore 88f and bottomed at its opposite end against a brake shoe 220 which is in active engagement with the peripheral wall of the shaft or pin 88a. The bore 88e, of course, is in register with the pin or shaft 88a.

A second brake shoe 222 engages with the other side of the pin or shaft 88a and also bottoms a coil spring 88j, the opposite end of which is engaged against the plug 88h in the threaded bore 88g. The spring loaded braking action provides sufficient resistance to the rotation of the pin or shaft 88a to tighten up any slackness and thereby insure precise positioning of the suction cup means 74 relative to the corresponding mold halves 14a and 14b.

To further enhance such action, the lever arm 80a and the upper turret member 88 has detent means therebetween including appropriate male and female parts and which detent means are shown respectively at 221 and 223, corresponding to the outer and inner positions of the cam follower means 80,80. Such detent means provide stability of positioning of the lever arm 80a at the two extreme positions of adjustment from which positions of adjustment the lever arm 80a will note be moved unless a positive displacement force generated by the cam surface acting against the cam follower wheel is imposed thereby.

In order to place one or more labels on the trolley or carriage means 24, it is contemplated by the present invention that there be a label pick-up station situated at a specific point in the closed circuit of the continuous flowing arrangement. Such provision is most clearly depicted in FIG. 4 wherein a storage magazine filled with a supply of labels is indicated generally at 34 which comprises a label rack 200 in which are charged a supply of labels 202. The rack 200 is positioned at a positive angle with respect to horizontal thereby affording a gravity feed to provide a label 32 at the bottom end of the rack 200 for removal therefrom. To assist in an even gravitational flow, a weight 204 is provided which is mounted on slide tracks 205.

In order to transfer labels from the dispenser 34 and interpose such labels in the path of the suction means 74 on the trolley or carriage 24, the label storage mechanism includes a frame 201 having bracket means 201a mounting a pin or axel 201b on which is pivotally mounted a lever arm 206.

It will be understood that there are two mold halves 14a and 14b and it is contemplated by the present invention that separate labels be provided for each mold half. Accordingly, when two separate label supplies are provided, all of the parts are duplicated and like reference numbers are applied to lie parts. Thus, as shown on FIG. 11, for example, the two separate arms 206 are shown in spaced-apart relation. However, both are driven in unison by a drive gear 214 which is co-rotatably connected with the arms 206 via the shaft 201b. The gear has teeth 212 on its periphery which are designed to mesh with corresponding teeth 208a formed on the periphery of a gear segment on a pivot shaft 209 and pivotally connected as at 208c to the end of a lever arm 208d. The lever 208d in turn is pivotally connected as at 208e to a crank arm 208f rotatably driven in unison with the sprocket 42 carried by a shaft 42a.

As the crank arm 208f is rotated, the lever 208d actuates the segment 208b so that it oscillates around the axis of the shaft 209 and the inner-mesh of the teeth 208a with the teeth 212 on the gear 214 will correspondingly oscillate the arm 206.

On the end of each arm 206 there is located a suction means including a suction cup 206a carried at the end of conduit 206b. Upon engagement with the end label in the magazine 34, the label will be engaged by the suction cup 206a and will be readily removed from the stack of labels 202. The arm 206 then is pivotally displaced and is placed in register with the continuous flow circuit in position to be intersected and engaged by the suction cup means 74 on the trolley or carriage 24.

In operation, the label picking action is accomplished by the suction cups engaging a label 32 at the bottom of the stack 202. Thus, the arm 206 together with its suction cup means 206a can effectively draw away a single label 32 from the stack 202.

To prevent inadvertent discharge of labels 32 from the label rack, small finger-like projections are employed around the periphery of the label and extend around the front label engagement frame 201 at the bottom end of the rack 200. The fingers provide adequate label retention. It is also contemplated that the rack 200 be relatively adjustable with respect to the frame 201, thereby to selectively align the stack of labels with respect to the transfer arm 206.

Referring to FIGS. 11 and 13, it will be noted that the spacing dimensions between the suction cups 206a, 206a are positioned in such location as to permit the suction cups 74 and 76 of each of the turrets 68 and 70 to pass therebetween. Moreover, in order to insure a rigid contact surface on each of the labels 32 for each of the suction cup members 74 and 76 to cooperatively engage, the labels 32 are drawn slightly inward by the suction cups 206a, 206a as shown by the dashed lines in FIG. 13. Such slight inward suction creates a rigid line on each of the labels 32 so that the suction cup members 74 and 76 upon engagement can engage the labels without wrinkling.

The in-mold labeler mechanism of the present invention is provided with a coordinated suction or negative air pressure system. Negative air pressure is generated at a suitable source of supply and is directed to a central air supply hub 152 which is rotatably mounted on an axle 153. It will be noted that the hub has a plurality of coupling connectors 152a corresponding in number to the number of trolley or carriages 24 carried on the guide track means 26. A flexible air conduit 150 is connected to each of such coupling connectors 152a on the hub 152 and, in turn, is connected at its opposite end to a corresponding trolley or carriage 24 as clearly depicted in FIG. 4.

To drive the central air supply hub 152 in synchronism with the continuous flow contemplated in the closed circuit formed by the guide track means 24, the central air supply hub 152 is rotatably driven by a pulley belt 182 or drive chain, which in turn is driven by a sprocket 180 having an input wheel 180a and an output wheel 180b. The input wheel has a pulley belt or chain 184 connected to the input wheel 180a and in turn is trained over an output wheel 42b provided on the sprocket 42.

As is most clearly shown on FIG. 10a, each air line 140 is connected to a corresponding trolley or carriage 24 near the base member 58 by a fitting 154. From the opposite side of the fitting 154, another air line directs air to a central cutoff valve 158 positioned near the center of and depending from the base member 58. From the valve 158 extends an air line 160 which connects to a manifold 162 having a "T" output 164 at its other end. Extending from each output of the "T" output 164 are air lines 166 and 168 which run to another valve 170 on each of the turrets 68 and 70, respectively. Each valve 170 has two outputs, 170a and 170b, which, in turn, direct air to an air chamber 172 on each arm 86 which connects with each suction cup member 74 and 76 within each upper block assembly 88.

By virtue of such arrangement, the suction cup members 74 and 76 can push the labels 32 against the mold halves 14a and 14b and resiliently mounted arm members 86 can retract from any overtravel and prevent damage to any members while the air is constantly being supplied to the chamber 172 and the suction cup members 74 and 76. Therefore, the labels 32,32 will only be released when the shut-off valve 158 is activated to stop the air suction within each turret 68 and 70. This occurs when the base of the valve 158 which has a ball switch 158a on its bottom, is triggered by a block 174 on the guide track section 40 as each trolley or carriage 24 passes over the block 174 (see FIG. 7). The block 174 is selectively positioned so that the air is cut off precisely after the labels 32 are in contact with the mold halves 14a and 14b. At this point, air from each mold half 14a and 14b retains each label through air channels shown at 176 and 178 (FIG. 7).

It is contemplated by the present invention that the elements of the in-mold labeler flow continuously without interruption through a closed circuit or secondary path provided by the guide track means 26. Accordingly, it is necessary and desirable that a drive system be provided which will coordinate the continuous flowing movements of all of the different parts and the details of such coordinated driving system from a single driving motor source of power is illustrated in particular detail in FIGS. 1, 2 and 3. Thus, a drive system is shown generally at 18 for a blow molding machine 12 which consists of a motor 100 whose drive shaft 102 is connected to a drive sprocket 104 engaging a chain 106 connected to the central axis 16 of the blow molding machine 12 and providing rotation of the wheel W. Thus, in effect, the wheel is rotated and the various mold sections disposed on the periphery of the wheel are driven through a first closed circuit or primary path since the rotation of the wheel is continuous and without interruption.

The two paths are matched over a discrete distance through which the mold parts and the carriage means move in unison at zero relative velocity and over the span of which the label is moved into the mold part and deposited therein.

On the end of the drive shaft 102, there is provided a second sprocket 108 engaging a chain 110 which in turn drives a sprocket 112 of a drive shaft 114. The shaft 114 is in driving relationship with another shaft 116 and is provided with universal joints as shown at 116a and 116b at each of its ends through a clutch 118.

Figure 2:
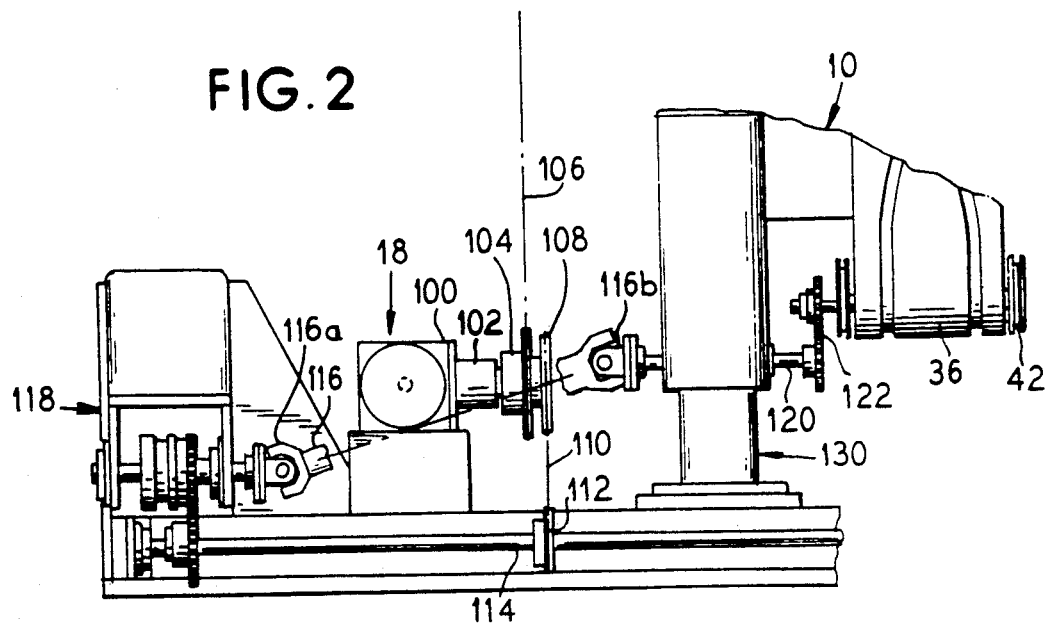
FIG. 2 is a fragmentary elevational view of a unitary drive system somewhat schematic and illustrating how the in-mold labeler of the present invention is connected to blow molded drive system for unison synchronous drive relation.
Figure 3:
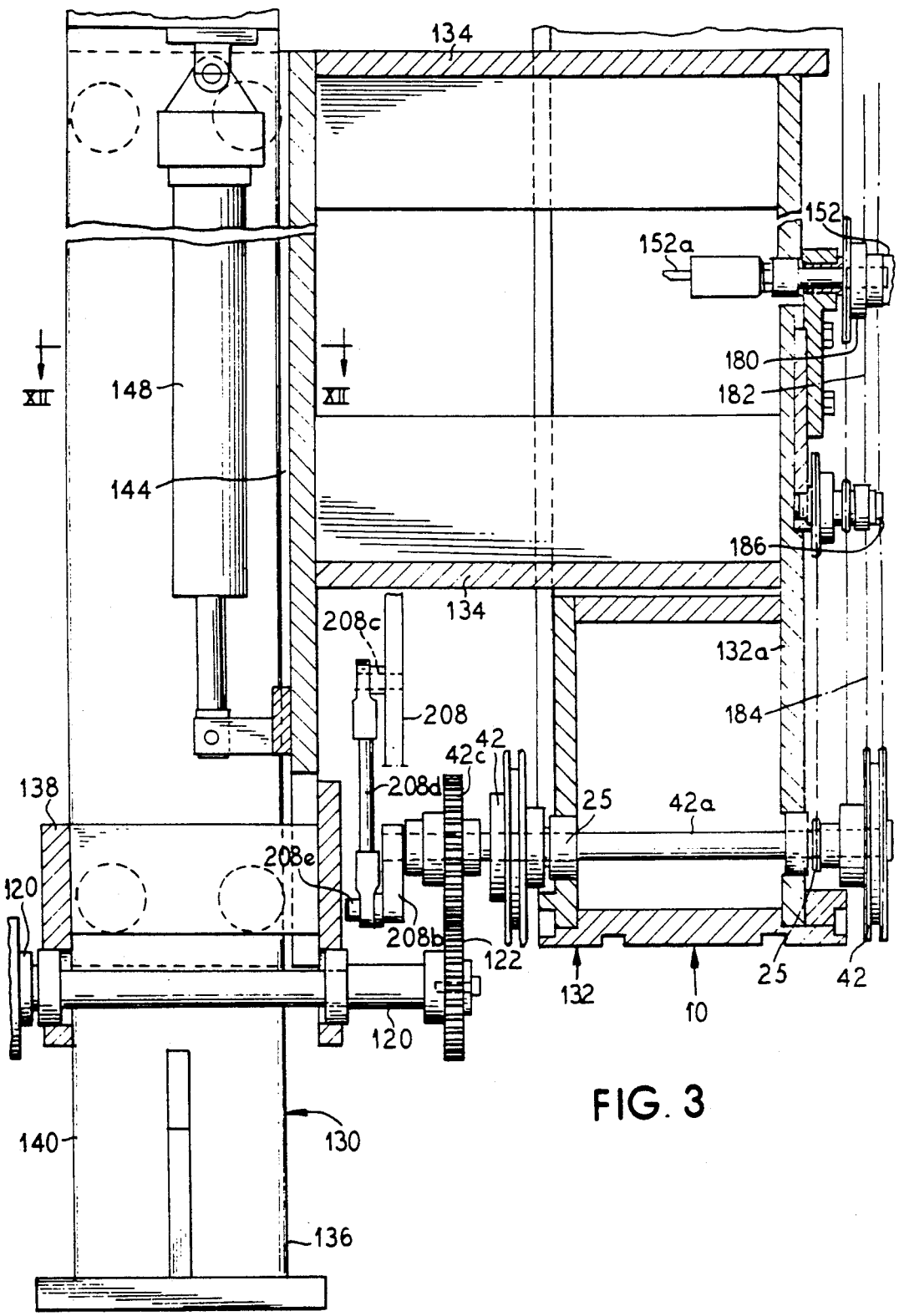
FIG. 3 is an enlarged fragmentary cross-sectional view of the in-mold labeler of the present invention, taken on line III—III of FIG. 1.
Figure 4:
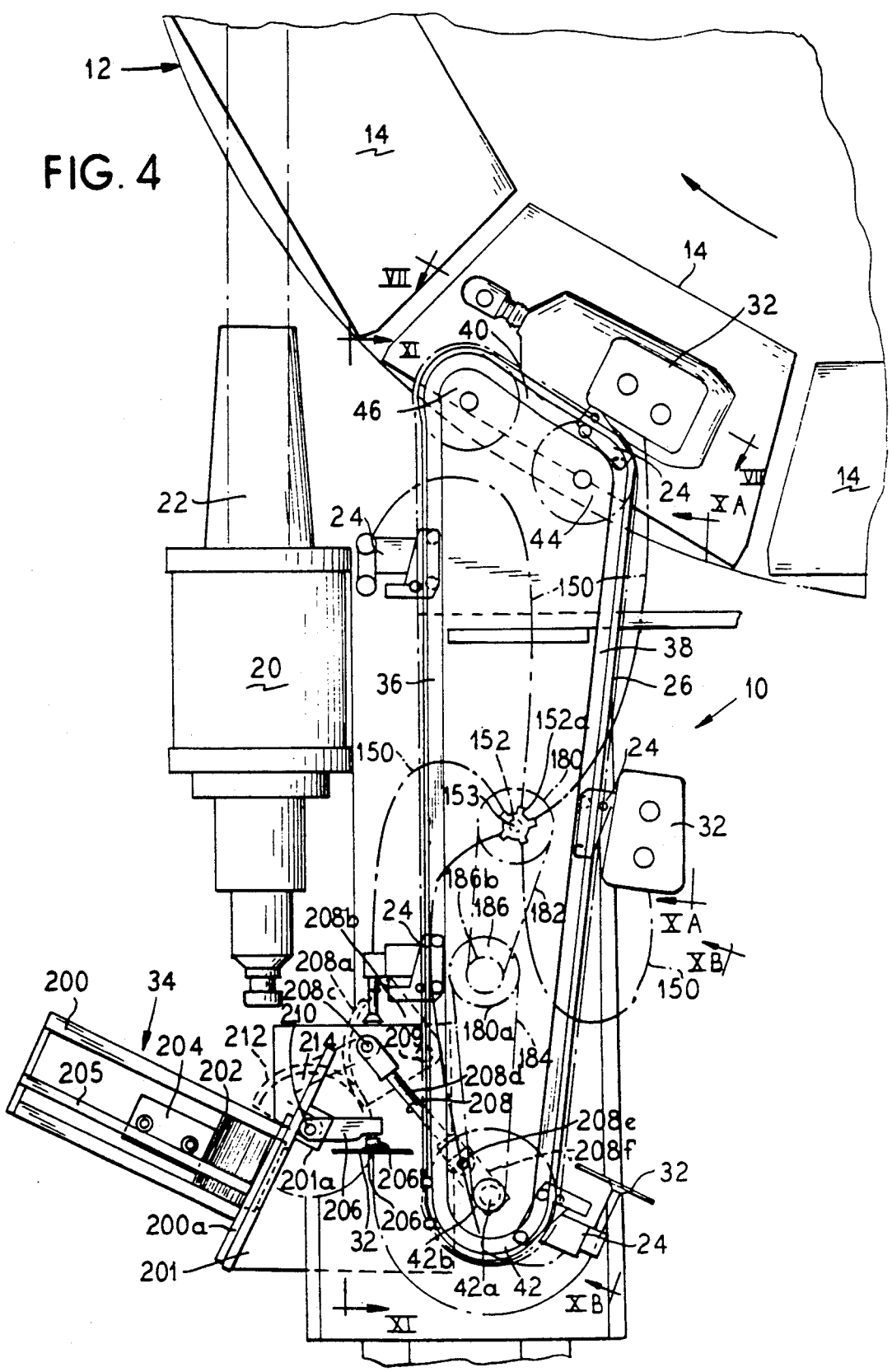
FIG. 4 is a view somewhat similar to FIG. 1, but from an opposite side and is enlarges to show additional details of the in-mold labeler of the present invention.

Referring specifically to FIG. 2, it will be noted that the shaft 116 connected to the universal joint 116b is then attached to a shaft 120 which is journaled in a pedestal or support member 130 (FIG. 3). The shaft 120 drives a shaft which is co-rotatably connected to the sprocket 42 of the in-mold labeler 10 via a gear 122 shown on FIGS. 2 and 3. The gear associated with the sprocket 42 is shown in FIGS. 2 and 3 at 42c and is mounted on the shaft of 42a. It will be appreciated that by selectively choosing the appropriate components and the proportional sizes and dimensions of the components of the drive system, the speed of the in-mold labeler is synchronized with the speed of the wheel and the rotational speed of the mold halves on the periphery of the wheel W of the blow molding machine 12.

Adjustment means are also contemplated whereby variations may be accommodated in terms of locating the deposit of the labels 32 within the respective mold halves 42a and 42b. Such adjustment means are shown in FIG. 3 and it is contemplated that the guide track support member 132 (FIG. 3) have an internal frame 132a to which the guide track means 26 and the sprockets 42, 44 and 46 are affixed.

The guide track support member 132 is connected to the pedestal 130 by means of supports shown at 134. The pedestal 130 provides the height adjustment of the in-mold labeler 10 and comprises a base section 136 and a movable frame section 138 which is connected to the guide track support member 132.

Referring particularly to FIG. 3 in connection with FIG. 12, it will be noted that the base section 136 has two upstanding support members 140 and 142 each having a guide track section 144. The movable frame section 138, in turn, has roller wheels 146 which engaged the guide track sections 144 for a rotational movement.

An elevation adjustment actuator is shown at 148 and is provided to effect the desired height adjustment as the movable frame section 138 rides upwardly or downwardly on the support members 140 and 142 via the rollers 146. Note that the universal joints 116a and 116b of the driving mechanism permit the drive shaft 116 to move along with the in-mold labeler 10 without interruption to its driving capabilities.

Figure 5:
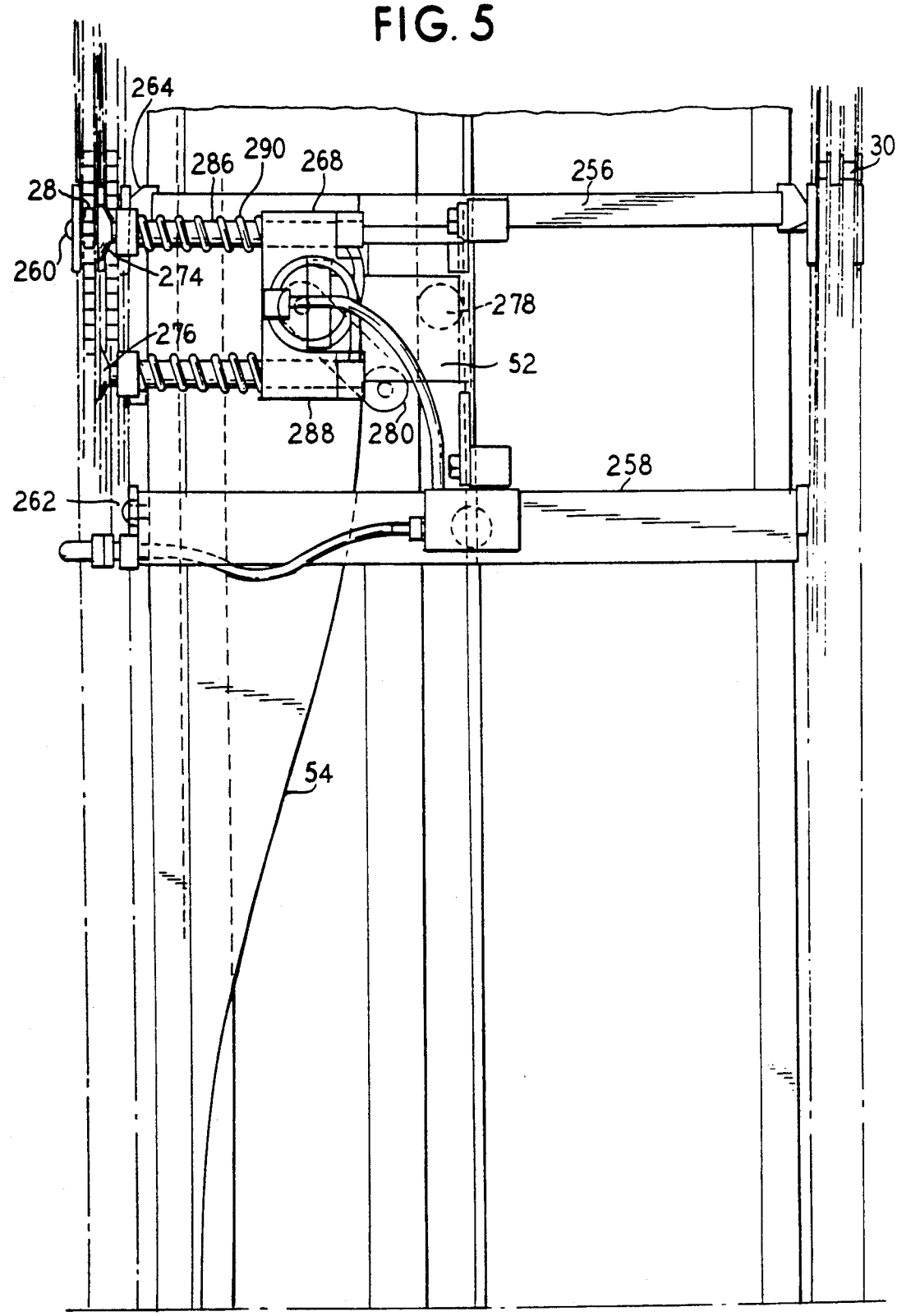
FIG. 5 is a view on the same plane as FIG. 10a, but shows a single label version of the invention.

FIG. 5 illustrates a modification of the present invention wherein only a single label 32 is intended to be deposited in a desired mold half either 14a or 14b. In describing such embodiment, like reference numerals have been employed prefixed so that the numbers are in the 200 series.

Referring specifically to FIG. 5, it will be noted that the essential basic structure of each trolley or carriage 224 is similar to that already described. Thus, each trolley or carriage 224 comprises cross base members 256 and 258 affixed at their ends to drive chains 228 and 230 by connectors 260 and 262 having a bracket 264 which is guided by wheels 266 adapted to be confined within channels 248 and 250 provided by the guide track means 226.

Moreover, each trolley 224 has one turret assembly 268 which is composed of a base block 272 and two air suction cup members 274 and 276 with two corresponding cam followers 278 and 280. The base block 272 has a channel 282 within which the member 256 is received thereby to provide slidable engagement therebetween.

The turret 268 can be positioned anywhere along the length of the base member 256. Stop members 284 are provided to prevent the turret from disengaging the base member 256.

The turret 268 has an upper block assembly 288 which rotates due to the interaction of the cam 254 and the follower 280 and is equipped with detents 272a and detent recesses 280a. Rotational braking its provided by two frictional engagement shoe members 220 and 222.

In FIG. 5, the turret 268 shown with the suction cup members 274 and 276 facing outwardly. Thus, the turret 268 is inherently in the proper position for lateral movement into the mold half 14a or 14b when in alignment therewith. With such an arrangement, the suction cup members 274 and 276 could engage a label stack by direct lateral displacement, or as previously described, the turret could be rotated to place the suction cup members into position to engage a label.

In operation, the invention herein disclosed contemplates that there will be provided an in-mold labeling method and apparatus wherein a plurality of molds are continuously and sequentially moved through a first closed circuit. At one point in such first closed circuit, there is continuously formed a parison of moldable plastic material and at such one point, the mold halves are open so that a portion of the parison may be drawn off into each respective mold segment at the first point in the first circuit.

The charged mold is then closed and a gaseous medium is introduced into the parison to expand the parison into a hollow object corresponding in size and shape to the mold.

The molded article is subsequently ejected thereby conditioning the mold for repeating the continuous cycle.

Simultaneously with the establishment of the first closed circuit, there is a second closed circuit through which a plurality of carriages are continuously and sequentially driven. Each carriage has suction means for picking up one or more labels from a label supply station situated at a designated point in the second closed circuit whereupon the carriage carries the label to where the second closed circuit registers with the open mold at paths matched over a discrete distance through which the mold parts and the carriage means move in unison at zero relative velocity and over the span of which the label is transferred from the carriage to the corresponding mold part. Both circuits are simultaneously and synchronously driven in unison from a common power source thereby to continuously effect in-mold labeling of all of the articles molded in the first closed circuit.

More specifically, and referring to FIG. 1 of the drawings, it will be noted that a blow molding machine having a wheel W rotates in the direction of the arrow and has its mold halves open so that a portion of the parison 22 may be drawn off and situated between the mold halves.

The in-mold labeler of the present invention has a continuous closed circuit for the carriage means and each carriage means moves down the leg 36 of the guide track means past the label station 200. As the carriages move down the leg 36, the suction cup means are disposed in alignment relative to the direction of travel. The continuous oscillation of the label feed means positions a label in register with the suction cup means on the carriage thereby effecting a transfer. On the leg 38 going upwardly, the suction means are first rotated 90 degrees by camming grooves in the guide track means and when in register with the open mold halves at the leg 40 of the guide track means, the suction cup means are moved laterally outwardly to deposit the labels into the respective mold halves. Thus, as the mold halves receive the parison and closed on the drawn off portion thereof, the in-mold labeling procedure is completed.

On the way back to the leg 36, the carriage means are conditioned to reposition the suction cup means for taking on a new label.

Although various minor modifications might be suggested by those versed in the art, it should be understood that I wish to embody within the scope of the patent warranted hereon all such modifications as reasonably and properly come within the scope of my contribution to the art.

I claim as my invention:

1. The method of in-mold labeling of a blow molded article which includes the steps of:
    continuously driving a trolley to continuously move the trolley through a closed circuit;
    at one point in the circuit pressure pre-positioning a label to be applied to the molded article as it continuously moves;
    drawing-off and pressure retaining the label onto the continuously moving trolley for further continuous movement in the circuit;
    at a second point in the circuit shifting the continuously moving trolley and its label in a lateral direction towards relative zero velocity registration with a moving mold without interruption of the continuous movement of the trolley in the circuit;
    at a third point in the circuit simultaneously releasing retaining pressure on the continuously moving trolley while pressure retaining the label on the moving mold to transfer the label to the mold;
    at a fourth point in the circuit shifting the continuously moving trolley in a lateral direction to condition the trolley for picking up another label without interruption of the continuous movement of the trolley in the circuit; and
    thereafter recycling the continuously moving trolley to said first point in the circuit.

2. The method of in-mold labeling of a blow molded article which includes the steps of:
    continuously driving a trolley to continuously move the trolley through a closed circuit;
    at one point in the circuit pressure pre-positioning at least two labels to be applied to the molded article;
    drawing-off and pressure retaining the labels onto the continuously moving trolley for further continuous movement in the circuit;
    at a second point in the circuit repositioning the continuously moving trolley and the labels for lateral movement;
    at a third point in the circuit shifting the continuously moving trolley and its labels in lateral directions towards relative zero velocity registration with a moving mold without interruption of the continuous movement of the trolley in the circuit;
    at a fourth point in the circuit simultaneously releasing retaining pressure on the continuously moving trolley while pressure retaining the labels on the moving mold to transfer the labels to the moving mold corresponding to the points of relative zero velocity registration;
    at a fifth point in the circuit repositioning the continuously moving trolley for a lateral movement;
    at a sixth point in the circuit shifting the continuously moving trolley in a lateral direction to condition the trolley for picking up at least another two labels without interruption of the continuous movement of the trolley in the circuit; and
    thereafter recycling the continuously moving trolley to said first point in the circuit.

* * * * *